(12) United States Patent
Togashi

(10) Patent No.: US 6,922,329 B2
(45) Date of Patent: Jul. 26, 2005

(54) MULTILAYER CAPACITOR

(75) Inventor: Masaaki Togashi, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 10/914,135

(22) Filed: Aug. 10, 2004

(65) Prior Publication Data

US 2005/0041368 A1 Feb. 24, 2005

(30) Foreign Application Priority Data

Aug. 21, 2003 (JP) ........................... 2003-297784

(51) Int. Cl.⁷ ............... H01G 4/228; H01G 2/20
(52) U.S. Cl. ................... 361/309; 361/308.1
(58) Field of Search ..................... 361/303–305, 361/306.1, 306.2, 306.3, 308.1, 309, 311

(56) References Cited

U.S. PATENT DOCUMENTS

| | | | | |
|---|---|---|---|---|
| 4,658,328 A | * | 4/1987 | Sakabe ................... | 361/309 |
| 4,814,940 A | * | 3/1989 | Horstmann et al. ....... | 361/309 |
| 6,292,351 B1 | * | 9/2001 | Ahiko et al. ............ | 361/306.3 |
| 6,594,136 B2 | * | 7/2003 | Kuroda et al. .......... | 361/306.1 |
| 6,765,781 B2 | * | 7/2004 | Togashi ................. | 361/306.3 |

FOREIGN PATENT DOCUMENTS

| | | | | |
|---|---|---|---|---|
| JP | 59-93123 | 6/1984 | | |
| JP | 11-329894 | 11/1999 | | |
| JP | 2001-210544 | 8/2001 | | |
| JP | 2002-151349 | 5/2002 | | |
| JP | 2002-231559 | 8/2002 | | |
| JP | 2003-100552 | 4/2003 | | |
| JP | 2003-168621 | * | 6/2003 | ............ H01G/4/30 |

* cited by examiner

Primary Examiner—Eric W. Thomas
(74) Attorney, Agent, or Firm—Oblon, Spivak, McClelland, Maier & Neustadt, P.C.

(57) ABSTRACT

A multilayer capacitor includes: a capacitor body formed by stacking a plurality of dielectric sheets with a first internal conductor and a second internal conductor sandwiching at least one of the dielectric sheets; a signal terminal electrode disposed on a side face of the capacitor body and connected to the first internal conductor; a leadout portion led out from the second internal conductor in a plurally divided form; and a grounding terminal electrode disposed on a side face of the capacitor body and connected to the second internal conductor via the leadout portion. Therefore, it is possible to reduce structural defects or the like to enhance reliability and to reduce ESL to allow more effective execution of a noise countermeasure in a high frequency range.

12 Claims, 7 Drawing Sheets

MULTILAYER CAPACITOR

BACKGROUND OF THE INVENTION

1. Field of the Invention

The present invention relates to a multilayer capacitor used as a noise filter or the like capable of reducing structural defects or the like to enhance reliability and reducing equivalent series inductance (ESL) to allow more effective execution of a noise countermeasure in a high frequency range, and more particularly, to that suitable for use in a circuit of data processing equipment and communication equipment.

2. Description of the Related Art

Data processing equipment and communication equipment in recent years are mostly digitalized, and further, the frequency of digital signals handled in these kinds of equipment is becoming higher in accordance with the increased speed of data processing capability. Accordingly, noises generated from these equipments similarly tend to increase in a high-frequency range. As a noise countermeasure, many of these equipments use electronic components for preventing electromagnetic interference and inhibiting unnecessary voltage fluctuation. Multilayer capacitors are in general use as such electronic components for noise countermeasure.

However, ESL (equivalent series inductance) which is a parasitic component of a multilayer capacitor acts as an obstruction to an effect of filtering out noises in a high-frequency range, and thus this effect is becoming less sufficient as the operating frequency or the like of the equipment is becoming still higher. In other words, multilayer capacitors having a large ESL such as a conventional one cannot respond to the recent tendency toward a higher frequency.

Therefore, in order to realize a noise countermeasure in a high-frequency range, multilayer feedthrough capacitors, which are multilayered type feedthrough capacitors, are manufactured for use as capacitors with reduced ESL. A multilayer feedthrough capacitor 110, which is shown in FIG. 6, FIG. 7(A), and FIG. 7(B), will be hereinafter described.

The multilayer feedthrough capacitor 110 has a multilayer body 120 shown in FIG. 6 in which dielectric sheets 122 and dielectric sheets 124 are stacked, the dielectric sheets 122 each having a first internal conductor 112 led out to two side faces opposite to each other, and the dielectric sheets 124 each having a second internal conductor 114 led out to two sides different from the abovementioned two sides, as shown in FIG. 7.

Further, a pair of terminal electrodes 132 both connected to the first internal conductors 112 are disposed on both ends of the multilayer body 120, and a pair of terminal electrodes 134 both connected to the second internal conductors 114 are disposed on both side faces of the multilayer body 120. The pair of terminal electrodes 132 are connectable to a signal line side and the pair of terminal electrodes 134 are connectable to a ground side.

However, since the frequency handled in recent equipment has become remarkably high, which further increases noises, and the lower power consumption of the equipment lowers operating voltage, noise resistance of the equipment is deteriorating. Under such circumstances, there is a demand for an electronic component for noise countermeasure exhibiting a high noise filtering effect in a higher frequency range. Moreover, further reduction in ESL is an important issue also for a multilayer feedthrough capacitor in order to cope with such a current situation.

Therefore, further reduction in ESL has been contemplated in the multilayer feedthrough capacitor as structured above. A design generally adopted for this purpose is such that, as shown in FIG. 8, the width dimension of leadout portions 114A of the second internal conductor 114 connected to the terminal electrodes 134 connected to the ground side are made as wide as possible and accordingly, the terminal electrodes 134 are also made wide.

However, when the width dimension of the leadout portions of the second internal conductor is increased, the joining strength between dielectrics is lowered at these portions. As a result, structural defects such as a crack may occur in these portions or the element strength of the multilayer body may be significantly lowered at the time of ceramic sintering for processing the dielectrics to the multilayer body. Accordingly, resistance against an external stress such as the deflection of a substrate deteriorates, giving rise to the concern about reliability deterioration.

SUMMARY OF THE INVENTION

In consideration of the above-described situation, it is an object of the present invention to provide a multilayer capacitor capable of reducing structural defects or the like to enhance reliability and reducing ESL to allow more effective execution of a noise countermeasure in a high frequency range.

According to one of the modes of the present invention, provided is a multilayer capacitor including: a capacitor body formed by stacking a plurality of dielectric sheets with a first internal conductor and a second internal conductor sandwiching at least one of the dielectric sheets; a signal terminal electrode disposed on a side face of the capacitor body and connected to the first internal conductor; a leadout portion led out from the second internal conductor in a plurally divided form; and a grounding terminal electrode disposed on a side face of the capacitor body and connected to the second internal conductor via the leadout portion.

The multilayer capacitor structured above has the following operation.

According to the multilayer capacitor of this mode, the capacitor body is formed by stacking the plural dielectric sheets with the first internal conductor and the second internal conductor sandwiching at least one dielectric sheet. Further, the signal terminal electrode connected to the first internal conductor and the grounding terminal electrode connected to the second internal conductor via the leadout portion are disposed on the side faces of the capacitor body respectively. Further, in the multilayer capacitor according to this mode, the leadout portion connected to the grounding terminal electrode is formed to be led out from the second internal conductor in the plurally divided form.

Therefore, since the leadout portion of the second internal conductor connected to the grounding terminal electrode is divided into a plurality of portions, the dielectric sheets come in contact with each other also in gaps between the divided leadout portions. Owing to the increase in joining area, this structure prevents the joining strength between the dielectrics from deteriorating, compared with the structure such that the width dimension of the leadout portion of the second conductor is simply made larger.

As a result, structural defects such as a crack do not occur in a portion where the leadout portion exists at the ceramic sintering time for processing the stacked dielectric sheets into a multilayer body, and in addition, the element strength of the multilayer body is increased to enhance resistance against an external stress such as the deflection of a substrate, leading to enhanced reliability of the multilayer capacitor.

Therefore, according to the multilayer capacitor of this mode, dividing the readout portion into the plural portions reduces the structural defects or the like to enhance reliability, and reduces ESL to allow more effective execution of a noise countermeasure in a high frequency range.

According to another mode of the present invention, provided is a multilayer capacitor including: a capacitor body formed by stacking a plurality of dielectric sheets with a first internal conductor and a second internal conductor sandwiching at least one of the dielectric sheets, the first internal conductor and the second internal conductor extending in directions intersecting each other; a signal terminal electrode disposed on a side face of the capacitor body and connected to the first internal conductor; a leadout portion led out from the second internal conductor in a plurally divided form; and a grounding terminal electrode disposed on a side face of the capacitor body different from the side face on which the signal terminal electrode is disposed and connected to the second internal conductor via the leadout portion.

The multilayer capacitor as structured above has the following operation.

The multilayer capacitor according to this mode includes the same structure as that of the multilayer capacitor of the above-described mode. It further includes the structure such that the first internal conductor and the second internal conductor extend in the directions intersecting each other, and accordingly, the signal terminal electrode and the grounding terminal electrode are disposed on the side faces different from each other of the capacitor body.

Therefore, it is possible to not only obtain the same operation as that of the multilayer capacitor of the above-described mode but also downsize the multilayer capacitor owing to the optimum arrangement of these terminal electrodes on the side faces of the capacitor body.

DETAILED DESCRIPTION OF THE PREFERRED EMBODIMENTS

Hereinafter, a first embodiment of the multilayer capacitor according to the present invention will be described based on the drawings.

Figure 1:
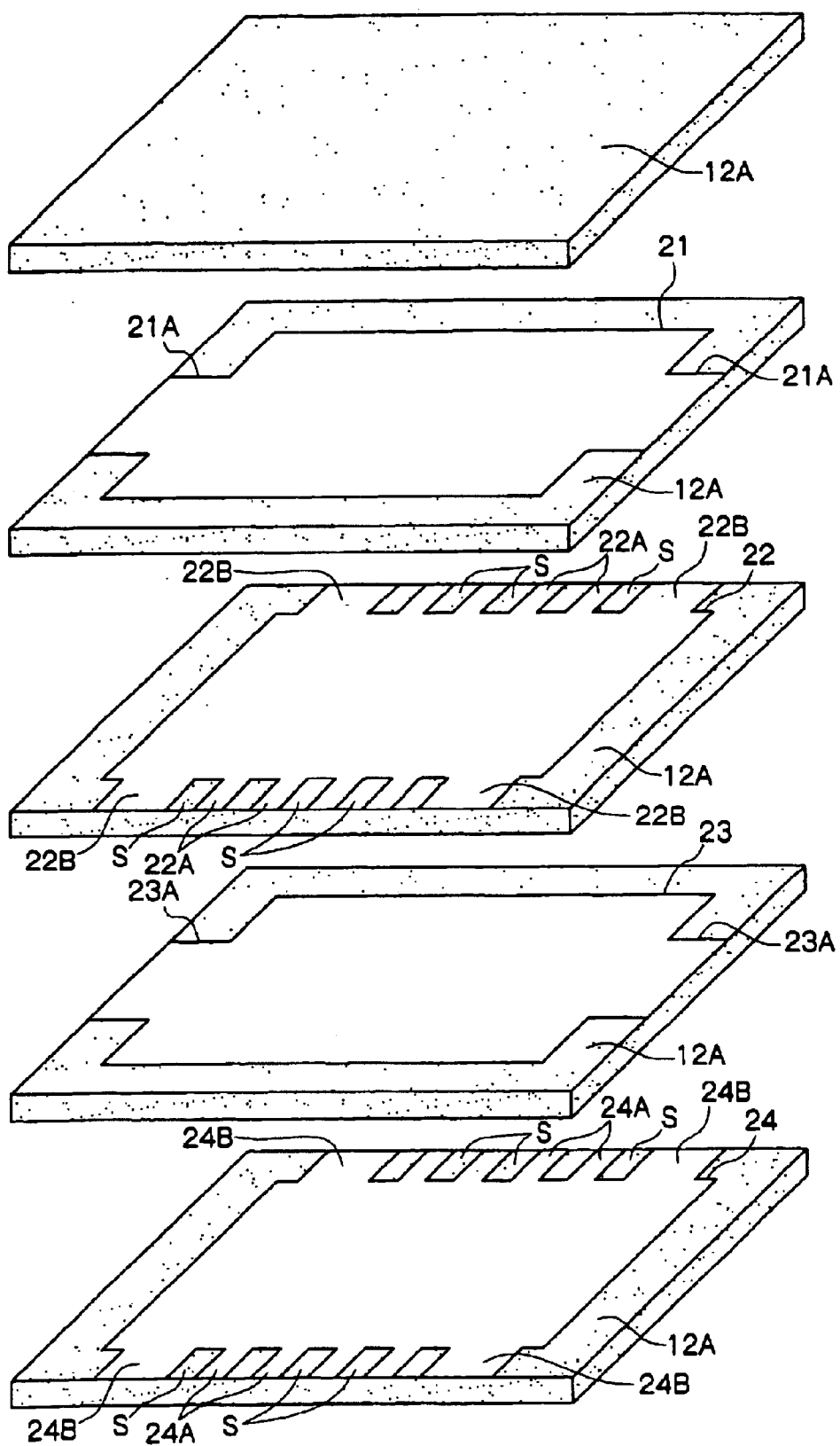
FIG. 1 is an exploded perspective view of a multilayer feedthrough capacitor according to a first embodiment of the present invention.
Figure 2:
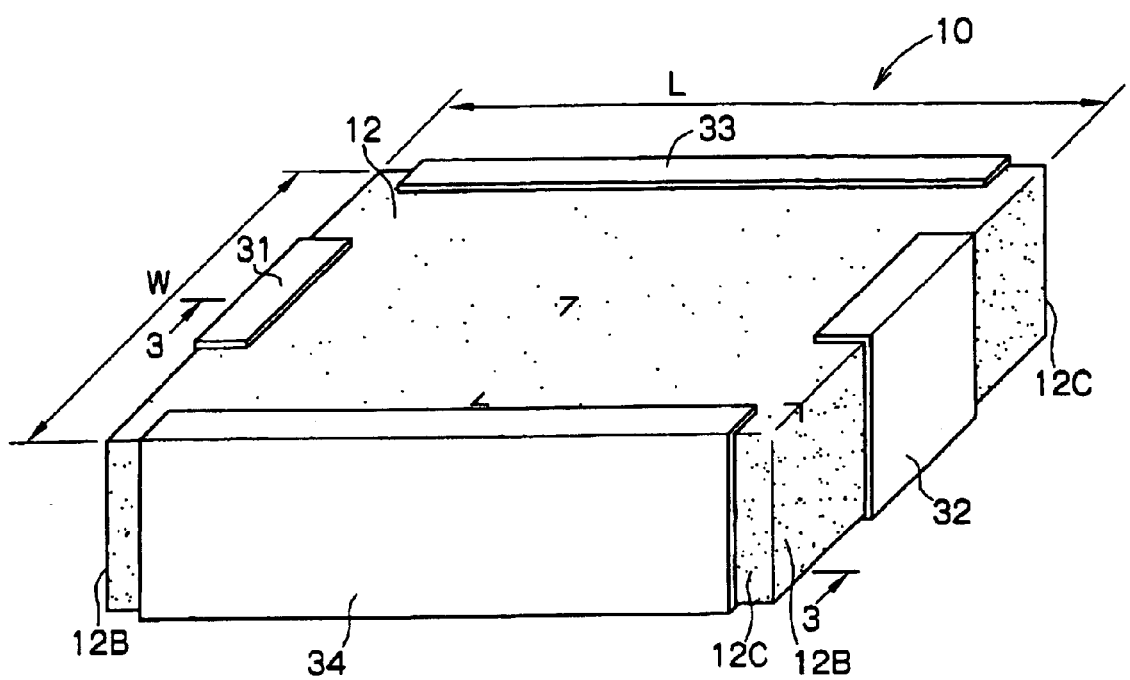
FIG. 2 is a perspective view showing the multilayer feedthrough capacitor according to the first embodiment of the present invention.
Figure 3:
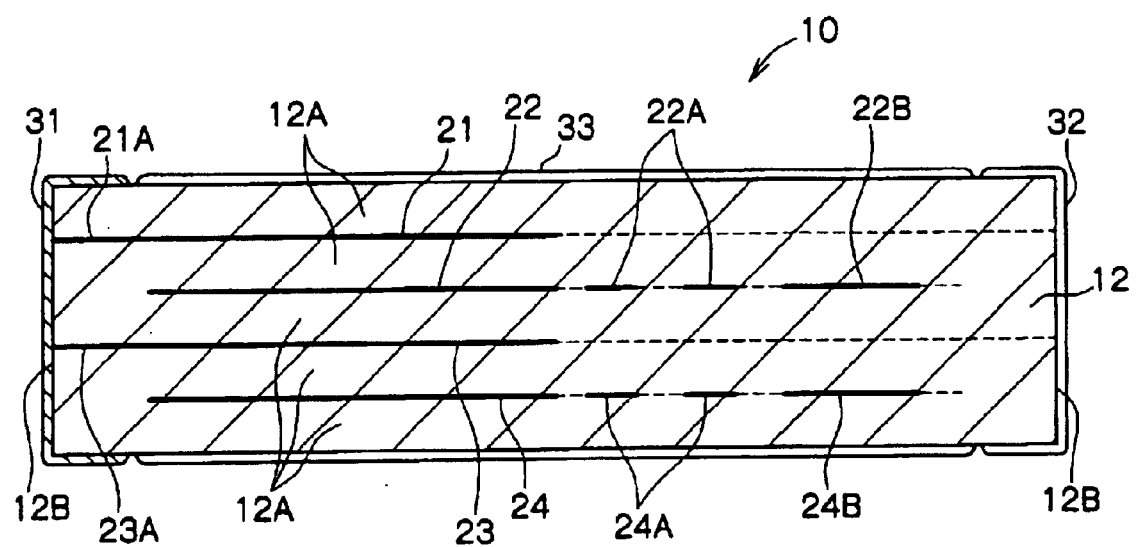
FIG. 3 is a cross sectional view showing the multilayer feedthrough capacitor according to the first embodiment of the present invention taken along the 3—3 line in FIG. 2.

As shown in FIG. 1 to FIG. 3, a multilayer feedthrough capacitor 10 being the multilayer capacitor according to the first embodiment of the present invention includes as a major portion thereof a dielectric element 12 which is a multilayer body in a rectangular parallelepiped shape which is obtained by sintering a stack of a plurality of ceramic green sheets being dielectric sheets.

As shown in FIG. 1 and FIG. 3, an internal electrode 21 extending from right to left of FIG. 1 of the dielectric element 12 is disposed at a predetermined height position in the dielectric element 12. In the dielectric element 12, an internal electrode 22 extending from the near side to the back side of FIG. 1 of the dielectric element 12 is also disposed under the internal electrode 21 across a ceramic layer 12A being the sintered ceramic green sheet.

Further, in the dielectric element 12, an internal electrode 23 extending from right to left of FIG. 1 of the dielectric element 12 similarly to the internal electrode 21 is disposed under the internal electrode 22 across a ceramic layer 12A. Further, in the dielectric element 12, an internal electrode 24 extending from the near side to the back side of FIG. 1 of the dielectric element 12 similarly to the internal electrode 22 is disposed under the internal electrode 23 across a ceramic layer 12A.

Accordingly, internal electrodes, namely, the internal electrodes 21 to 24 are disposed to face each other, being separated by the ceramic layers 12A serving as dielectric layers in the dielectric element 12. In other words, the internal electrode 21 and the internal electrode 22 sandwich at least one ceramic layer 12A, and the internal electrode 23 and the internal electrode 24 sandwich at least one ceramic layer 12A. Moreover, the plural ceramic layers 12A are stacked to form the dielectric element 12 being a capacitor body.

The internal electrodes 21, 23 being a first internal conductor form a signal transmission path, and the internal electrodes 22, 24 being a second internal conductor extending in a direction intersecting an extension direction of the internal electrodes 21, 23 form electrodes of the capacitor. Note that the number of layers of the internal electrodes is not limited to only four but may be larger, and a usable material of these internal electrodes is, for example, nickel, a nickel alloy, copper, or a copper alloy.

In this structure, from the internal electrodes 21, 23 shown in FIG. 1, leadout portions 21A, 23A having a smaller width than that of the internal electrodes 21, 23 are led out to the right and left sides of FIG. 1 respectively. Further, the internal electrode 22 shown in FIG. 1 has leadout portions 22A, 22B in a plurally divided form that are led out from the internal electrode 22 to the near and back sides of FIG. 1 respectively. Note that the right-most and left-most leadout portions 22B among the plural leadout portions 22A, 22B have a larger width than that of the leadout portions 22A positioned on an inner side.

Similarly, the internal electrode 24 has leadout portions 24A, 24B in a plurally divided form that are led out from the internal electrode 24 to the near and back sides of FIG. 1 respectively. The right-most and left-most leadout portions 24B among the plural leadout portions 24A, 24B also have a larger width than that of the readout portions 24A positioned on an inner side.

As shown in FIG. 1 to FIG. 3, a pair of signal terminal electrodes 31, 32 are disposed on a left side face 12B and a right side face 12B of the dielectric element 12 shown in FIG. 2 respectively so as to be connected to both ends of the internal electrodes 21, 23 via the leadout portions 21A, 23A respectively. Further, a pair of grounding terminal electrodes 33, 34 are disposed on a side face 12C on the back side and a side face 12C on the near side of the dielectric element 12 shown in FIG. 2 respectively. The pair of grounding terminal electrodes 33, 34 are connected to both ends of the internal electrode 22 via the leadout portions 22A, 22B led out to the two side faces 12C opposite to each other, respectively, and are connected to both ends of the internal electrode 24 via the readout portions 24A, 24B similarly led out to the two side faces 12C opposite to each other, respectively.

As a result, in this embodiment, the signal terminal electrodes 31, 32 are disposed on the right and left side faces 12B of the multilayer feedthrough capacitor 10 respectively, and the grounding terminal electrodes 33, 34 are disposed on the side faces 12C on the back and near sides respectively, as shown in FIG. 2. This means that this embodiment has a four-terminal structure in which the terminal electrodes 31 to 34 are disposed on the four side faces 12B, 12C of the dielectric element 12 in a rectangular parallelepiped shape which is a hexahedron shape. The pair of signal terminal electrodes 31, 32 are connectable to the signal line side, and the pair of the grounding terminal electrodes 33, 34 are connectable to the ground side.

Next, the operation of the multilayer feedthrough capacitor 10 according to this embodiment will be described.

In the multilayer feedthrough capacitor 10 according to this embodiment, one layer of the ceramic layer 12A is sandwiched between the internal electrode 21 and the internal electrode 22 extending in the directions intersecting each other, and one layer of the ceramic layer 12A is sandwiched between the internal electrode 23 and the internal electrode 24 similarly extending in the directions intersecting each other. One layer of the ceramic layer 12A is also sandwiched between the internal electrode 22 and the internal electrode 23. The plural ceramic layers 12A are stacked to form the dielectric element 12.

The signal terminal electrodes 31, 32 connected to the internal electrodes 21, 23 via the leadout portions 21A, 23A, and the grounding terminal electrodes 33, 34 connected to the internal electrodes 22, 24 via the leadout portions 22A, 22B, 24A, 24B are disposed on the four side faces 12B, 12C different from each other of the dielectric element 12, respectively.

In this embodiment, the leadout portions 22A, 22B in a plurally divided form connected to the grounding terminal electrodes 33, 34 are led out from both ends of the internal electrode 22. Similarly, the leadout portions 24A, 24B in a plurally divided form connected to the grounding terminal electrodes 33, 34 are led out from both ends of the internal electrode 24.

This means that owing to the plurally divided form of the leadout portions of the internal electrodes 22, 24 connected to the grounding terminal electrodes 33, 34, the ceramic green sheets come in contact with each other also in gaps S between the divided portions of the leadout portions 22A, 22B and between the divided portions of the leadout portions 24A, 24B. Owing to the increase in joining area, this structure prevents the joining strengths between the ceramic green sheets from deteriorating, compared with the structure such that the width dimension of the readout portions of the internal conductors are simply made larger.

As a result, no structural defect such as a crack occurs in places where the leadout portions exist at the time of the ceramic sintering for processing the stack of the ceramic green sheets into the dielectric element 12. Further, the element strength of the dielectric element 12 is increased to enhance resistance against an external stress such as the deflection of a substrate on which the multilayer feedthrough capacitor 10 is mounted, leading to enhanced reliability of the multilayer feedthrough capacitor 10.

Therefore, according to the multilayer feedthrough capacitor 10 of this embodiment, the plurally divided form of the leadout portions 22A, 22B and leadout portions 24A, 24B reduces the structural defects or the like to enhance reliability, and reduces ESL to allow more effective execution of a noise countermeasure in a high frequency range.

Further, in this embodiment, the internal electrodes 21, 23 and the internal electrodes 22, 24 are formed to extend in the directions intersecting each other, and the signal terminal electrodes 31, 32 and the grounding terminal electrodes 33, 34 are disposed on the side faces different from each other of the dielectric element 12. This structure realizes the optimum arrangement of the terminal electrodes 31 to 34 on the side faces 12B, 12C of the dielectric element 12, so that it is also possible to downsize the multilayer feedthrough capacitor 10.

Next, a second embodiment of the multilayer capacitor according to the present invention will be described based on FIG. 4 and FIG. 5. The same reference numerals and symbols are used to designate the same members as the members described in the first embodiment, and repeated explanation thereof will be omitted.

Figure 4:
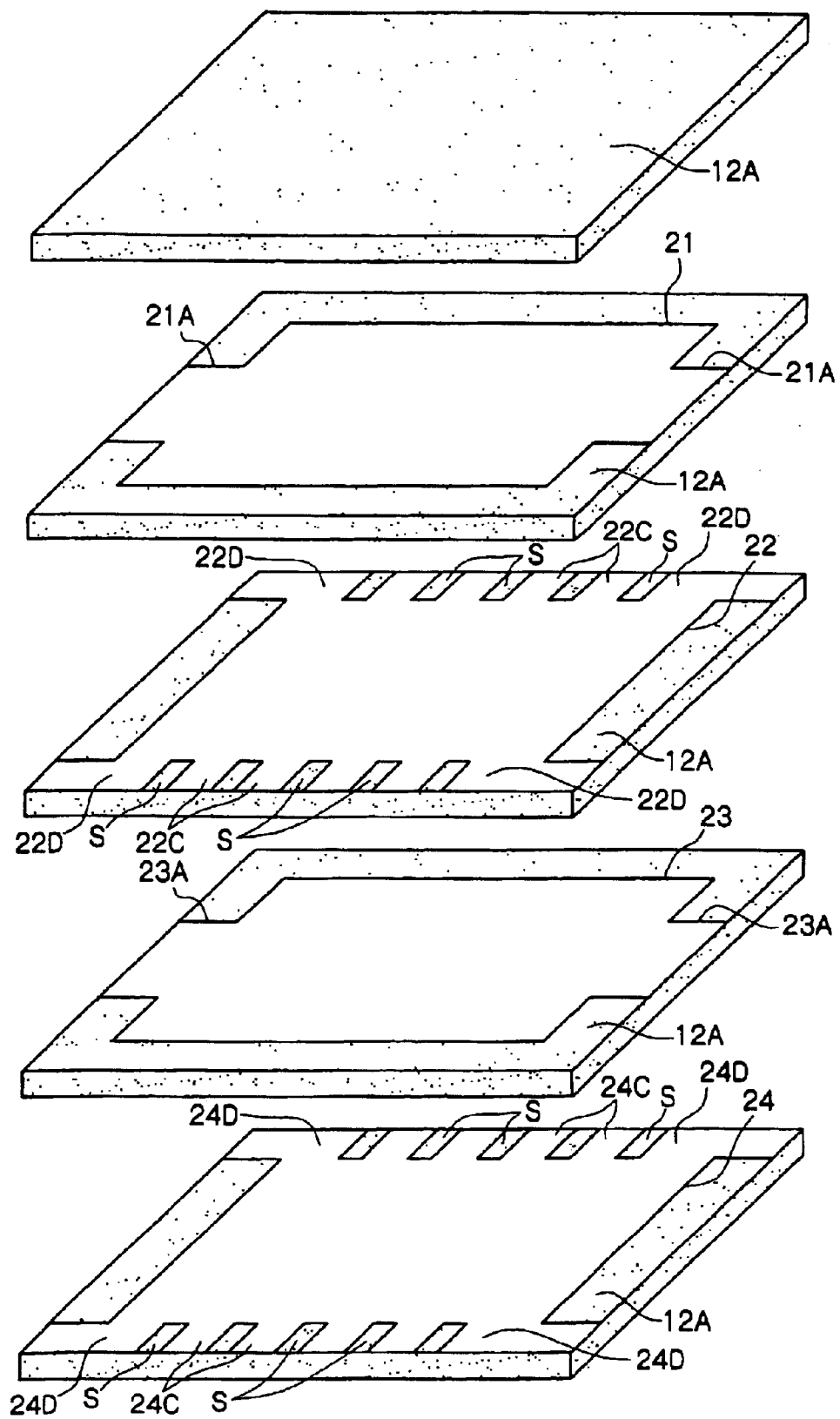
FIG. 4 is an exploded perspective view of a multilayer feedthrough capacitor according to a second embodiment of the present invention.
Figure 5:
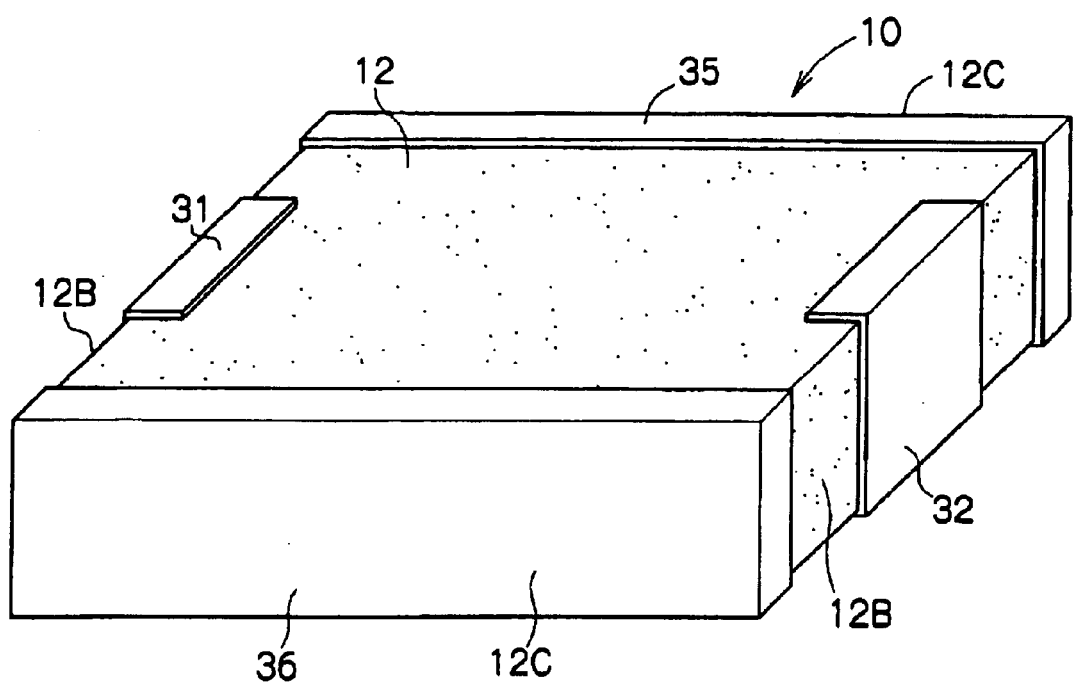
FIG. 5 is a perspective view showing the multilayer feedthrough capacitor according to the second embodiment of the present invention.
Figure 6:
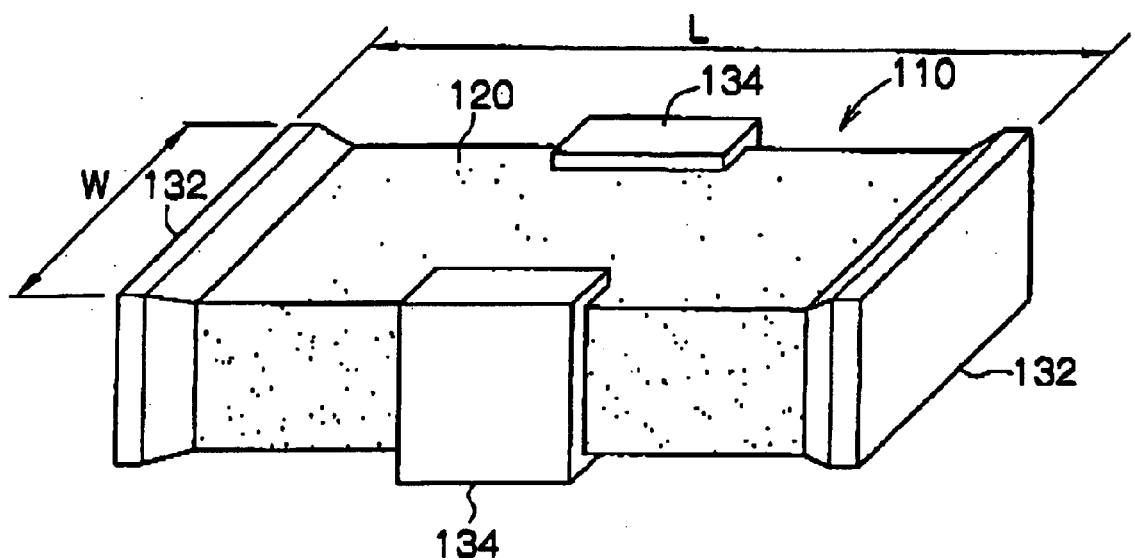
FIG. 6 is a perspective view showing a multilayer feedthrough capacitor according to a first conventional example.
Figure 7A:
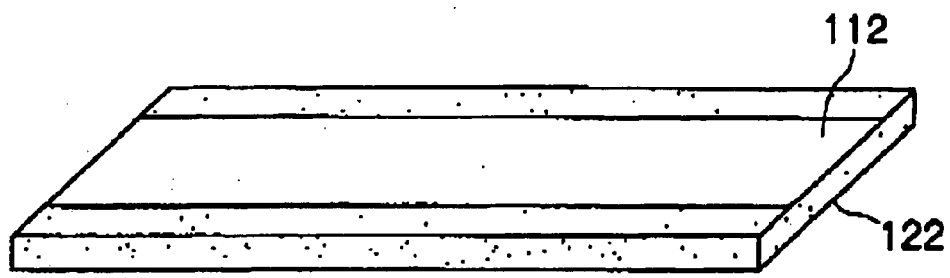
FIG. 7(A) is an exploded view of the multilayer feedthrough capacitor according to the first conventional example and is an exploded perspective view of a dielectric sheet on which a first internal conductor connectable to a signal line side is disposed.
Figure 7B:
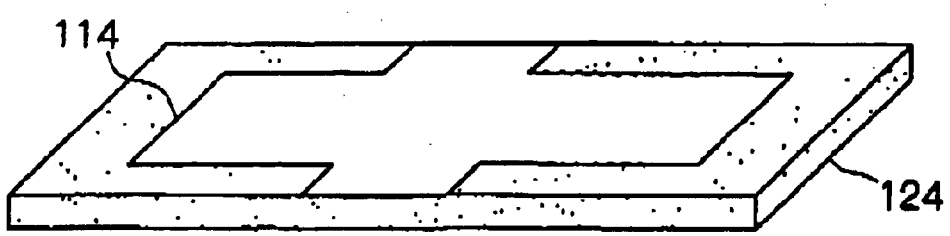
FIG. 7(B) is an exploded view of the multilayer feedthrough capacitor according to the first conventional example and is an exploded perspective view of a dielectric sheet on which a second internal conductor connectable to a ground side is disposed.
Figure 8A:
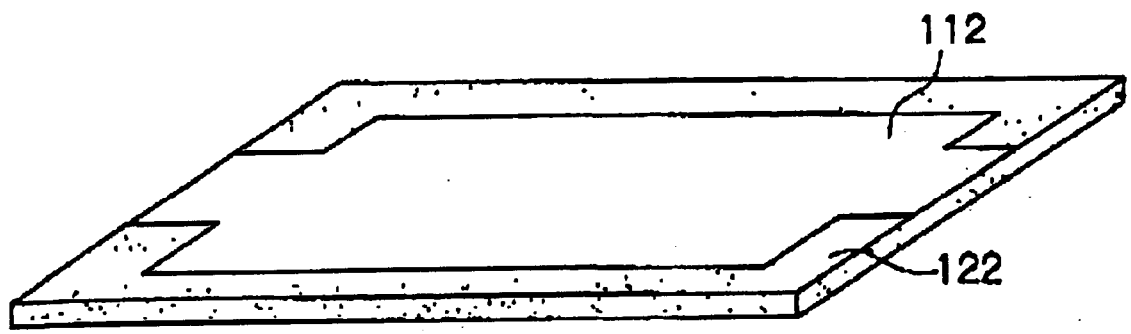
FIG. 8(A) is an exploded view of a multilayer feedthrough capacitor according to a second conventional example and is an exploded perspective view of a dielectric sheet on which a first internal conductor connectable to a signal line side is disposed.
Figure 8B:
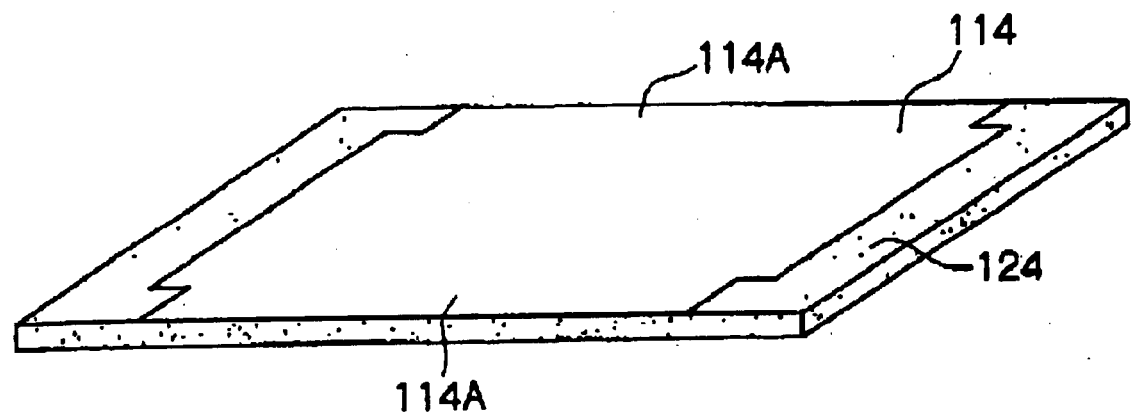
FIG. 8(B) is an exploded view of the multilayer feedthrough capacitor according to the second conventional example and is an exploded perspective view of a dielectric sheet on which a second internal conductor connectable to a ground side is disposed.

In this embodiment, in place of the leadout portions 22A, 22B of the internal electrode 22, leadout portions 22C, 22D larger in width than the leadout portions 22A, 22B and in a plurally divided form are formed to be led out from an internal electrode 22 to the near side and the back side of FIG. 4 respectively, as shown in FIG. 4 and FIG. 5. Further, in place of the leadout portions 24A, 24B of the internal electrode 24, readout portions 24C, 24D similarly larger in width than the leadout portions 24A, 24B and in a plurally divided form are formed to be led out from an internal electrode 24 to the near side and the back side of FIG. 4 respectively.

Therefore, in this embodiment, the leadout portions 22C, 22D and the leadout portions 24C, 24D are respectively disposed along the entire width of the side faces 12C of a dielectric element 12 that are larger in width than the internal electrodes 22, 24 respectively.

Accordingly, in place of the pair of grounding terminal electrodes 33, 34, a pair of grounding terminal electrodes 35, 36 shown in FIG. 5 wider than the pair of grounding terminal electrodes 33, 34 are disposed on side faces 12C on the back side and near side of the dielectric element 12 respectively to cover the entire areas of the respective side faces 12C in this embodiment. The pair of grounding terminal electrodes 35, 36 are connected to both ends of the internal electrode 22 via the leadout portions 22C, 22D respectively, and to both ends of the internal electrodes 24 via the leadout portions 24C, 24D respectively.

Therefore, the multilayer feedthrough capacitor 10 according to this embodiment is structured such that the leadout portions are formed as the leadout portions 22C, 22D and leadout portions 24C, 24D each having a large width, and the pair of grounding terminal electrodes 35, 36 connected to a ground side are accordingly formed to be wide. This structure further reduces ESL to allow more effective execution of a noise countermeasure in a high frequency range compared with the first embodiment.

Next, the results of the evaluation of a defect fraction on exfoliation and crack and of the measurement of ESL by a network analyzer that were conducted on the following samples will be discussed. Specifically, the multilayer feedthrough capacitor 110 of the conventional example, the multilayer feedthrough capacitor 10 of the first embodiment shown in FIG. 1 to FIG. 3, and the multilayer feedthrough capacitor 10 of the second embodiment shown in FIG. 4 and FIG. 5 were used as samples, and the defective fraction on exfoliation and cracks of each type of the samples was evaluated and ESL in each type of the samples was measured. Note that 1000 samples for each type were prepared for use in the evaluation and measurement.

The evaluation results were: among all the samples of the multilayer feedthrough capacitor 10 of the first and second embodiments, the defective fraction on the exfoliation and cracks was 0% while this defective fraction was 1.3% among all the samples of the multilayer feedthrough capacitor 110 of the conventional example. Therefore, it has been confirmed that the defective fraction on the exfoliation and cracks is greatly improved both in the multilayer feedthrough capacitors 10 of the respective embodiments of the present invention, compared with the multilayer feedthrough capacitor 110 of the conventional example.

Further, the ESL was 83 pH and 79 pH in the multilayer feedthrough capacitors 10 of the first and second embodiments respectively, while the ESL was 78 pH in the multilayer feedthrough capacitor 110 of the conventional example. Therefore, the ESL values both in the multilayer feedthrough capacitors 10 of the respective embodiments of the present invention are substantially the same as that of the multilayer feedthrough capacitor 110 of the conventional example, and thus it has been confirmed that the ESL does not greatly increase in the multilayer feedthrough capacitor 10.

Note that this ESL is found by the equation $2\pi f_0 = 1/\sqrt{(ESL \times C)}$, where $f_0$ is self-resonant frequency and C is capacitance. As for the dimension of each of the samples, the length L was set to 2.00 mm and the width W was set to 1.25 mm, and as for the capacitance, it was set to 1.06 $\mu$F for the multilayer feedthrough capacitor 110 in the conventional example and 1.02 $\mu$F for the multilayer feedthrough capacitors 10 of the embodiments of the present invention.

The multilayer feedthrough capacitor 10 according to each of the above-described embodiments includes the four internal electrodes 21 to 24, the four terminal electrodes 31 to 34 or the four terminal electrodes 31, 32, 35, 36. However, the number of layers, the number of the internal electrodes, and the number of the terminal electrodes are not limited to these numbers and may be larger.

According to the present invention, it is possible to provide a multilayer capacitor capable of reducing structural defects or the like to enhance reliability and of reducing ESL to allow more effective execution of a noise countermeasure in a high-frequency range.

What is claimed is:

1. A multilayer capacitor comprising:
a capacitor body formed by stacking a plurality of dielectric sheets with a first internal conductor and a second internal conductor sandwiching at least one of the dielectric sheets;
a signal terminal electrode disposed on a side face of the capacitor body and connected to the first internal conductor;
a leadout portion led out from the second internal conductor in a plurally divided form; and
two grounding terminal electrode disposed respectively on side faces of the capacitor body and connected respectively to the second internal conductor via the plural leadout portion.

2. The multilayer capacitor according to claim 1, wherein each of the dielectric sheets forming the capacitor body is a sintered ceramic layer.

3. The multilayer capacitor according to claim 1, wherein the first internal conductor and the second internal conductor disposed in the capacitor body are made of nickel, a nickel alloy, copper, or a copper alloy.

4. The multilayer capacitor according to claim 1, wherein the first internal conductor and the second internal conductor are both disposed in plurality in the capacitor body.

5. The multilayer capacitor according to claim 1, wherein the plural leadout portions led out from the second internal conductor are led out to two side faces opposite to each other of the capacitor body, respectively.

6. The multilayer capacitor according to claim 1,
wherein each of the plural leadout portions led out from the second internal conductor is disposed along an entire width of one side face of the capacitor body, the side face being wider than the second internal conductor, and
wherein at least one of the grounding terminal electrode is disposed to cover the entire area of the one side face of the capacitor body.

7. A multilayer capacitor comprising:
a capacitor body formed in a rectangular parallelpiped shape by stacking a plurality of dielectric sheets with a first internal conductor and a second internal conductor sandwiching at least one of the dielectric sheets, the first internal conductor and the second internal conductor extending in directions intersecting each other;
two signal terminal electrode disposed respectively on side faces of the capacitor body and connected respectively to the first internal conductor;
a leadout portion led out from the second internal conductor in a plurally divided form; and
two grounding terminal electrodes disposed respectively on side faces of the capacitor body different from the side faces on which the signal terminal electrodes are disposed and connected respectively to the second internal conductor via the plural leadout portions,
wherein the signal terminal electrode and the ground terminal electrodes are disposed respectively on the four side faces of the capacitor body.

8. The multilayer capacitor according to claim 7, wherein each of the dielectric sheets forming the capacitor body is a sintered ceramic layer.

9. The multilayer capacitor according to claim 7, wherein the first internal conductor and the second internal conductor disposed in the capacitor body are made of nickel, a nickel alloy, copper, or a copper alloy.

10. The multilayer capacitor according to claim 7, wherein the first internal conductor and the second internal conductor are both disposed in plurality in the capacitor body.

11. The multilayer capacitor according to claim 7, wherein the plural lead out portions led out from the second internal conductor are led out to two side faces opposite to each other of the capacitor body, respectively.

12. The multilayer capacitor according to claim 7, wherein each of the plural leadout portions led out from the second internal conductor is disposed along an entire width of one side face of the capacitor body, the side face being wider than the second internal conductor, and wherein at least one of the grounding terminal electrode is disposed to cover the entire area of the one side face of the capacitor body.

\* \* \* \* \*